2,959,622
PURIFICATION OF CRUDE β-β-BIS-(4-HYDROXY-PHENYL) PROPANE

Walter Grimme, Utfort-Moers, and Heinrich Schmitz, Moers-Meerbeck, Germany, assignors to Rheinpreussen Aktiengesellschaft für Bergbau und Chemie, Homberg-Niederrhein, Germany, a corporation of Germany No Drawing. Filed Aug. 26, 1955, Ser. No. 530,893

Claims priority, application Germany Sept. 6, 1954

8 Claims. (Cl. 260—619)

This invention relates to new and useful improvements in the purification of crude β-β-bis-(4-hydroxyphenyl) propane to produce a pure crystalline product.

It is known to prepare β-β-bis-(4-hydroxyphenyl) propane, which will be referred to hereinafter for the sake of brevity as diphenylolpropane, by condensing phenol with acetone in the presence of an acid condensation agent, and preferably in the additional presence of a catalyst which promotes the condensation reaction.

In this connection the acid condensation agents which may be used include, for example, hydrochloric acid, sulfuric acid, phosphoric acid, gaseous hydrogen chloride, sulfurochloride, hydrochloric acid with aluminium chloride or calcium chloride, hydrogen sulfide, alkyl mercaptanes, thiophenols, and organic thio acids.

The quantity of acid condensation agent used is not critical, though generally about 0.5–5 mols of the acid condensation agent are used per mol of the acetone. The degree of acidity is critical, and the pH should be maintained between about 1 and 5.

The catalyst which may be used for the condensation reaction include, for example, mercapto-substituted carboxylic acids and acid boron compounds, such as boric acid, as well as calcium chloride.

When acid boron compounds are used as catalysts, the quantities should be between about 0.5 and 5%, calculated as boric acid and based on the quantity by weight of phenol used.

The mercapto-substituted carboxylic acids include, for example, mercapto acetic acid, thiolactic acid, β-mercapto-propionic acid, α-, β- or γ-mercapto butyric acid, α, β-dimercapto butyric acid, and mercapto-substituted myristic, oleic, adipic, succinic, and aconitic acids. Mercapto-substituted aliphatic carboxylic acids having 2 to 5 carbon atoms, such as β-mercapto propionic acid, have been found preferable. In place of mercapto acids, their salts, esters, or other derivatives may be used, inasmuch as they are converted into mercapto acid by the acid condensation agent. Similarly, in place of the mercapto acids, their mercaptols or mercaptals, which are produced by the action of a ketone or an aldehyde on a mercapto acid may be used. The addition of 0.01 to 0.05 mol of a mercapto acid per mol of acetone is sufficient to bring about a substantial increase of the reaction velocity. Additions of 5 to 10% by weight of the mercapto acid, based on the acetone used, are, however, more effective, and do not cause detrimental effects. In order to effect the reaction, the phenol and acetone in the presence of the acid condensation agent, and preferably in the presence of the catalyst, are mixed together, and the reaction is effected at a temperature of about 20 to 50° C. After the completion of the reaction, the crude product is washed with water in order to remove the acid condensation agent.

This crude diphenylolpropane product obtained after the condensation reaction still contains unreacted phenol and is discolored by by-products produced in the condensation. Attempts have been made to distil the excess phenol off from the crude product by vacuum distillation, but the diphenylol propane obtained after this distillation is strongly discolored. This discoloration, which occurs upon vacuum distillation, may be decreased, if anhydrous hydrogen chloride or calcium chloride, together with hydrochloric acid, is used as a condensation agent, but even under these conditions, an injurious discoloration of the diphenylol propane cannot be avoided.

It has further been proposed to remove the excess phenol by steam distillation or by washing with a large amount of water or dilute acetic acid. It has further been proposed to separate the unreacted phenol from the diphenylolpropane by forming alkali or alkali earth salts of these compounds, which have different solubilities. None of these procedures, however, resulted in a sufficiently purified, colorless, diphenylolpropane.

In order to purify the diphenylolpropane, it has been proposed to subject the same to a recrystallization, using acetic acid or other organic solvent, such as ethylene dichloride, tetrachloroethane, chlorobenzene, or hexane. This purification by recrystallization, however, is only effective after the removal of the phenol and drying of the crude product, which involves additional steps and expense.

One object of this invention is the direct obtaining of a practically colorless, uniform, crystalline product from the crude, phenol-containing, discolored diphenylol propane. This, and still further objects will become apparent from the following description:

In accordance with the invention, it has been surprisingly found that the crude phenol-containing, discolored diphenylol propane can be converted into a practically colorless uniform crystalline product by a simple dissolving and crystallization process. In this connection, the unreacted phenol is at the same time recovered in a form suitable for reuse in the condensation process.

In accordance with the invention, the crude diphenylolpropane is washed with water in order to remove the acid condensation agent, and thereupon is neutralized with a compound having an alkaline reaction, such as an aqueous solution of an alkali metal hydroxide, alkali metal carbonate, alkali metal hydrocarbonate, or ammonia. The crude neutral product treated in this manner, which contains varying quantities of water, unreacted phenol, and inorganic salts produced by the neutralisation, and as a result of the incomplete washing, is dissolved while hot, in an organic water-immiscible solvent. In this connection, the phenol present in the crude diphenylol propane also dissolves in the organic solvent. After completion of the dissolving process, two layers form: an aqueous layer which contains dissolved in it all water-soluble by-products, such as the salts produced upon neutralization and an organic layer which contains the diphenylol propane in the bulk of the phenol. The aqueous layer is separated from the organic layer while the solution is still hot, as, for example, at a temperature which is just slightly below the boiling point of the solvent used. The organic phase is thereupon cooled with agitation, and the diphenylolpropane, which was dissolved therein, thereupon precipitates out in crystalline form. After the separation, the product is washed with a small quantity of the solvent and obtained as a practically colorless homogeneous crystalline product. It has a sharp melting point of about 154 to 155° C. The phenol which had been contained in the crude product, remains dissolved in the mother liquor.

The solvents which may be used for the isolation and crystallization of the diphenylolpropane in accordance with the invention, comprise organic solvents which are substantially immiscible in water and have a sufficiently large difference between the solubility of the diphenylolpropane therein at room temperature and at the boiling point to bring about easy crystallization. In order to limit the quantity of solvent required, the solvent should preferably furthermore have a sufficiently great dissolving power for the diphenylol propane while hot or at the boiling point. The solvents which are suitable include, for example, aliphatic and aromatic hydrocarbons, such as hexane, gasoline, benzene, or toluol, and chlorinated hydrocarbons, such as ethylene dichloride, trichlor ethylene, methylene chloride, chloroform, and chlorobenzene.

In the following table there are given, for a few solvents, the solubilities of diphenylolpropane therein at 18° C. and at the boiling point of the solvent.

| Solvent | Boiling Point, °C. | Spec. Gr. | Solubility of Diphenylolpropane | |
|---|---|---|---|---|
| | | | At 18° C., about | At the boiling point of the solvent, about |
| | | | Percent | Percent |
| Ethylene dichloride | 85 | 1.26 | 3.5 | 17–18 |
| Benzene | 82 | 0.88 | 0.9 | 7–8 |
| Methylene chloride | 42 | 1.34 | 1.5 | 5–6 |
| Chloroform | 61 | 1.50 | 1.1 | 3–4 |
| Trichloroethylene | 87 | 1.47 | 0.2 | 2–3 |
| Carbon tetrachloride | 77 | 1.60 | 0.05 | 0.8–1 |

These solvents will be referred to herein and in the claims as water-immiscible solvents suitable for the crystallization of diphenylolpropane.

The dissolution of the diphenylolpropane is effected by heating nearly to the boiling point of the solvent or by heating under reflux. The watery layer formed is discarded while the solution is still hot in order to prevent crystallizing out the diphenylolpropane, appropriately at a temperature close under the boiling point of the solvent. The diphenylolpropane-containing layer is cooled to such a degree that crystallization of the diphenylolpropane is caused. According to the dissolving qualities of the solvent used, it may be sufficient to cool down the diphenylolpropane-containing solution nearly to room-temperature while, by using other solvents, a more extensive cooling till to below 0° C. may be of advantage. The quantity of the solvent used is variable, but at least such a large quantity is to be used which is sufficient to completely dissolve the diphenylolpropane. The use of an exceeding quantity of the solvent is not injurious.

It may be noted from the table that ethylene dichloride is the most advantageous of the solvents set forth. In addition, diphenylolpropane has excellent crystallization tendency from hot saturated ethylene dichloride solutions.

When the crude diphenylolpropane is washed, as described above, in order to remove the acid condensation agent, substantial quantities of unreacted phenol pass into solution, and thus are lost with the waste water.

It has furthermore been found in accordance with a preferred embodiment of the invention that this loss may be avoided. In accordance with this embodiment, the crude water-containing diphenylolpropane, prior to neutralization, is suspended while cold in the water-immiscible organic solvent suitable for the crystallization of the diphenylolpropane by adding a quantity of water which is sufficient to dissolve the salts formed during the neutralization. The crude diphenylolpropane is then neutralized, while agitating, and thereafter dissolved by heating, thus forming the two layers. The aqueous layer is discarded from the organic layer while the solution is still hot, for example, at a temperature which is just slightly below the boiling point of the solvent used, while the dissolved diphenylolpropane containing layer is cooled, causing the crystallization of the diphenylolpropane. This mode of operation has the advantage that the unreacted phenol is recovered and only traces of phenol are lost with the discarded aqueous layer.

In accordance with the invention, a rapid and practically complete removal of water and of salts from the crude product is obtained. Thus, it is no longer necessary to remove the entire quantity of water from the crude product by means of dryers at elevated temperatures, which is time-consuming and very costly.

Further, a practically complete removal of the phenol from the crude product is effected and the discolored, contaminated, crude diphenylolpropane is rapidly converted into a practically colorless, homogeneous, crystalline product of very high purity.

A further surprising advantage in accordance with the invention of considerable importance is the fact that the mother liquor from the crystallization of the diphenylolpropane may be reused repeatedly for the dissolving and purifying of further batches of crude diphenylolpropane without the quality of pure crystalline diphenylolpropane produced being diminished. This is true in spite of the fact that the phenol concentration and the concentration of the colored by-products increases after each use.

This finding is entirely unexpected, since, in general, when using or reusing colored mother liquors for recrystallization, it must be expected that the crystalline product will also be discolored.

Only upon the appearance of an impediment of the quality of the crystalline diphenylol propane, is the mother liquid worked up, in which connection, after evaporation of the organic solvent which is in return to the process, the phenol contained in the dark residue is recovered in pure form by distillation. It is also possible to wash the mother liquid with an aqueous alkali hydroxide solution and in this manner remove the dissolved phenols and colored impurities, whereupon the organic solvent may be recycled to the process without further purification.

The method in accordance with the invention, in view of its simplicity and economy, has substantial advantages over all previously known processes for the production of pure crystalline diphenylolpropane.

Plastics from the pure product obtained in accordance with the invention are characterized by particularly valuable light shades, which constitute a substantial advance in the art.

The following examples are given by way of illustration and not limitation.

*Example 1*

200 kilograms of phenol are stirred with 68 kilograms of acetone for 24 hours in 500 kilograms 37% hydrochloric acid at a temperature of 35° C. and in the presence of 30 kilograms calcium chloride. After 4 hours, the crystallization of diphenylol propane commences, the color of the reaction material gradually changing during the reaction time from a light yellow to an orange-red. The reaction material suspended in water is suction-filtered, washed with a small amount of water, and neutralized with ammonia water, while agitating. The neutralized product is then filtered off again, using vacuum. This crude product is obtained in a yield of 300 kilograms. On the average, it still contains about 34% water and has a yellowish red color. The phenol content of the dry product is 6%, and its melting point is 96–143° C. It is therefore very inhomogeneous, due to the phenol and other impurities contained therein.

50 kilograms of the crude product obtained, having a diphenylol propane content of about 60%, are dissolved in 120 liters (equal to 150 kilograms) ethylene dichloride, while agitating and heating under reflux. This solution is allowed to stand for about one-half hour at about 30° C. without further agitation, in which connection the water contained in the crude product separates as an upper layer. The lower hot ethylene dichloride solution is forced through a heated filter, which retains mechanical impurities, into a water-cooled stirring apparatus. The diphenylol propane crystallizes very rapidly during the cooling with stirring, and is separated by means of a centrifuge after complete cooling. After washing with a small amount of ethylene dichloride, the product is dried. It is approximately pure white, and homogeneously crystalline, and has a sharp melting point of 154–155° C.

Analysis gave the following values: $C_{15}H_{16}O_2$—Computed: C, 78.94; H, 7.02. Found: C, 78.78; H, 6.95.

The yield is 23 grams or 77% of the theoretical yield, referred to the diphenylol propane contained in the crude product.

The quantity of the upper aqueous layer, which still contains as inorganic salt ammonium chloride from the neutralization reaction, is 17 kilograms, and is discarded.

The remaining 250 kilograms of the crude diphenylolpropane product is divided into five further batches of 50 kilograms each and treated in the same manner in each case as described above, except that in place of the ethylene dichloride, the mother liquor obtained from the previous purification is used. The purity of the product obtained from each, including the last batch described, corresponds to that of the product from the first batch described. A total of about 85 to 88% of the crude diphenylolpropane in pure crystalline form is obtained.

*Example 2*

200 kilograms of phenol are stirred with 70 kilograms acetone for 30 hours at 30° C. in 600 kilograms of 73% sulfuric acid. After the crystallized crude diphenylol propane is filtered off by suction from the acid, it is washed with only a small amount of water in order to remove the main portion of the adherent acid. The end product which is still acid is stirred at room temperature with 100 liters water and 800 kilograms ethylene dichloride in a stirring apparatus provided with heating means, and the suspension obtained is approximately neutralized by the addition of soda. Thereupon the suspension is heated to 80 to 85° C. with agitation, complete solution thus taking place. The solution is neutralized completely and set aside at about 80° C., so that two layers form. The hot lower ethylene dichloride solution is allowed to flow into a water-cooled stirring apparatus, the crystallization of the diphenylol propane taking place very rapidly upon stirring. After cooling, the crystalline product is centrifuged, washed, and dried. White crystals of a melting point of 154 to 155° C. are obtained.

The aqueous layer, which contains only very little phenol, is discarded.

*Example 3*

100 kilograms crude diphenylol propane, obtained in the manner described in Example 1, and containing 28% water and 8% phenol, are dissolved at 80 to 85° C. under reflux in a mixture of 250 kilograms ethylene dichloride in 150 kilograms benzene. Thereupon it is set aside at about 80° C., so that two layers form. After about half an hour, the lower layer of diphenylol propane solution is allowed to flow into a crystallizer. The upper aqueous layer, which weighs 29 kilograms, is discarded. 53 kilograms of a colorless uniformly crystalline diphenylol propane of a melting point of 154–155° C. are obtained.

The dark mother liquor obtained can be again used repeatedly for the removal of the water and purification of the crude diphenylol propane.

We claim:

1. Process for the production of substantially pure, substantially colorless crystalline, $\beta$-$\beta$-bis-(4-hydroxyphenyl) propane from the crude phenol and water-containing product obtained by the condensation of phenol with acetone which comprises neutralizing the crude phenol-containing, water-containing product, contacting the neutralized product with a water immiscible organic solvent in which the $\beta$-$\beta$-bis-(4-hydroxyphenyl) propane is soluble when heated but substantially insoluble when cooled, at an elevated temperature sufficient to dissolve the $\beta$-$\beta$-bis-(4-hydroxyphenyl) propane and at least a portion of the phenol, separating the aqueous layer which forms, thereafter cooling the hot solution to thereby crystallize $\beta$-$\beta$-bis-(4-hydroxyphenyl) propane therefrom and recovering the pure crystalline $\beta$-$\beta$-bis-(4-hydroxyphenyl) propane.

2. Process according to claim 1, in which said water-immiscible, organic solvent is present in an organic mother liquid from a previous crystallization of the $\beta$-$\beta$-bis-(4-hydroxyphenyl) propane.

3. Process according to claim 1, in which the organic mother liquid after said recovery is recycled for the dissolving of further crude $\beta$-$\beta$-bis-(4-hydroxyphenyl) propane therein.

4. Process according to claim 1, in which said water-immiscible, organic solvent, comprises a mixture of at least two water-immiscible organic solvents in which $\beta$-$\beta$-bis-(4-hydroxyphenyl) propane is soluble when heated but substantially insoluble when cooled.

5. Process according to claim 1, in which said water-immiscible organic solvent is a member selected from the group consisting of ethylene dichloride and benzene.

6. Process according to claim 1, in which said water-immiscible, organic solvent is ethylene dichloride.

7. Process according to claim 1 including the additional step subsequent to the crystallization of evaporating the organic solvent and recovering the phenol contained in the residue in pure form by distillation.

8. Process for the production of substantially pure, substantially colorless crystalline, $\beta$-$\beta$-bis-(4-hydroxyphenyl) propane from the crude phenol and water-containing product obtained by the condensation of phenol with acetone which comprises adding to the crude phenol-containing, water-containing product a water immiscible organic solvent in which the $\beta$-$\beta$-bis-(4-hydroxyphenyl) propane is soluble when heated but substantially insoluble when cooled, neutralizing the said mixture, heating the mixture to an elevated temperature sufficient to dissolve the $\beta$-$\beta$-bis-(4-hydroxyphenyl) propane and at least a portion of the phenol, separating the aqueous layer which forms, thereafter cooling the hot solution to thereby crystallize $\beta$-$\beta$-bis-(4-hydroxyphenyl) propane therefrom and recovering the pure crystalline $\beta$-$\beta$-bis-(4-hydroxyphenyl) propane.

References Cited in the file of this patent

UNITED STATES PATENTS

| | | |
|---|---|---|
| 2,191,831 | Perkins | Feb. 27, 1940 |
| 2,334,408 | Gump et al. | Nov. 16, 1943 |
| 2,499,236 | Van Gilder et al. | Feb. 28, 1950 |